United States Patent Office 3,398,650
Patented Aug. 27, 1968

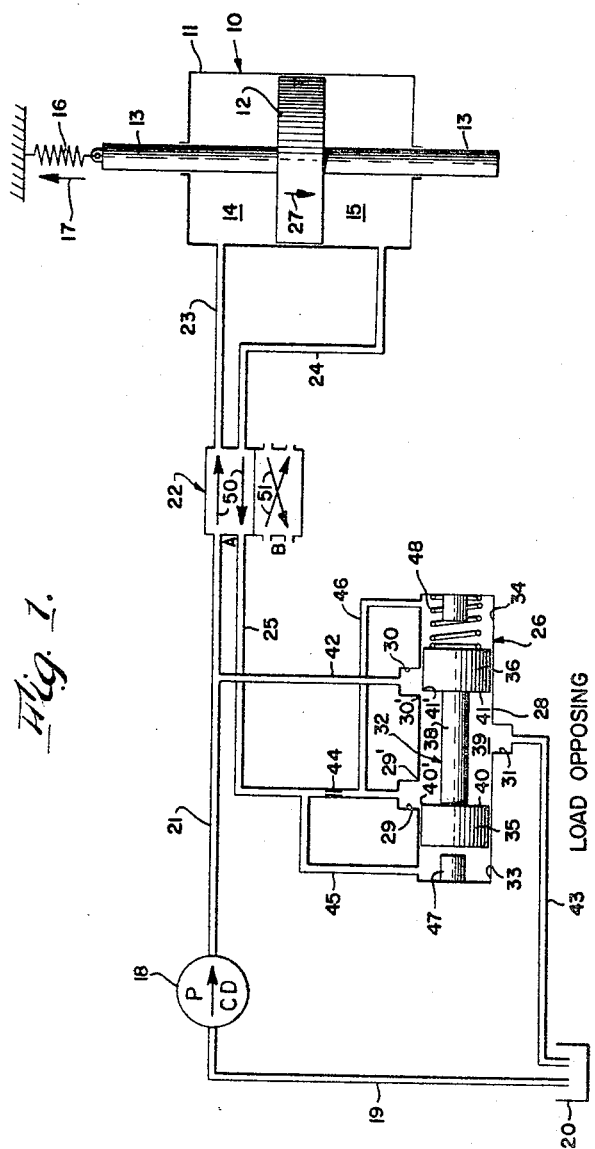
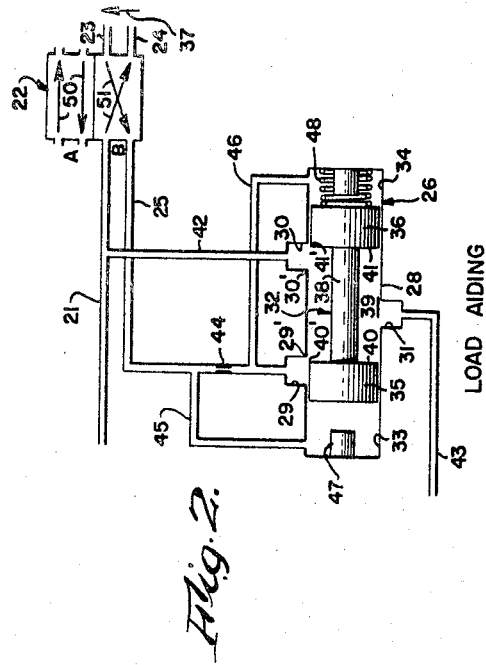
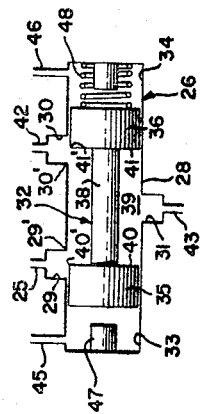

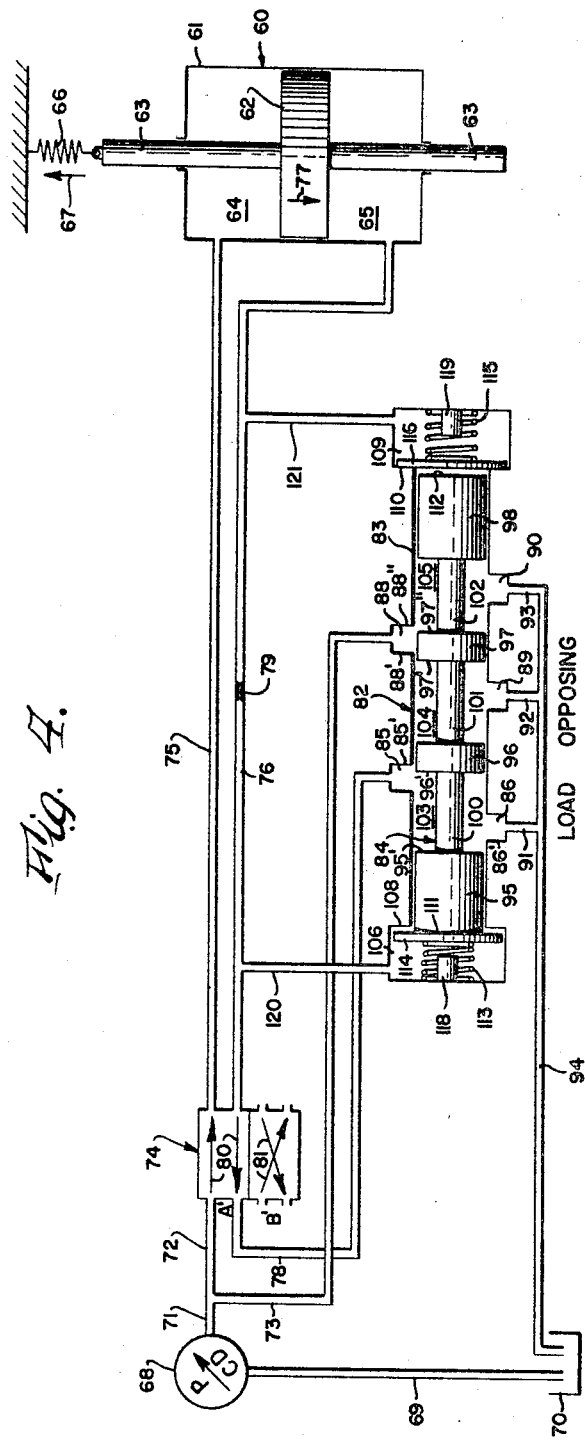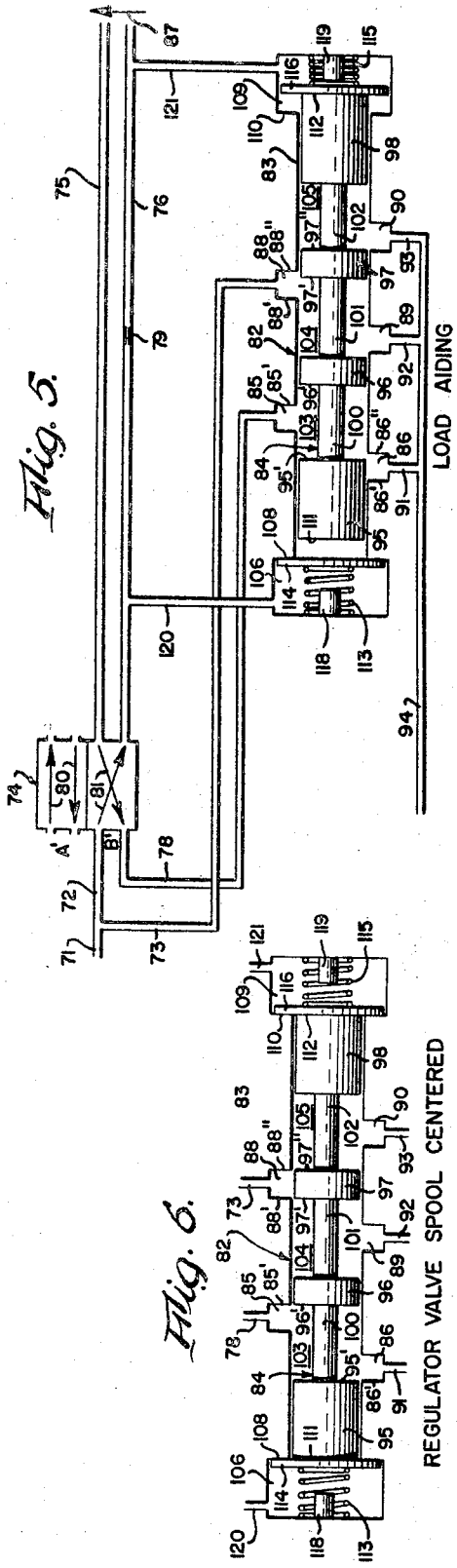

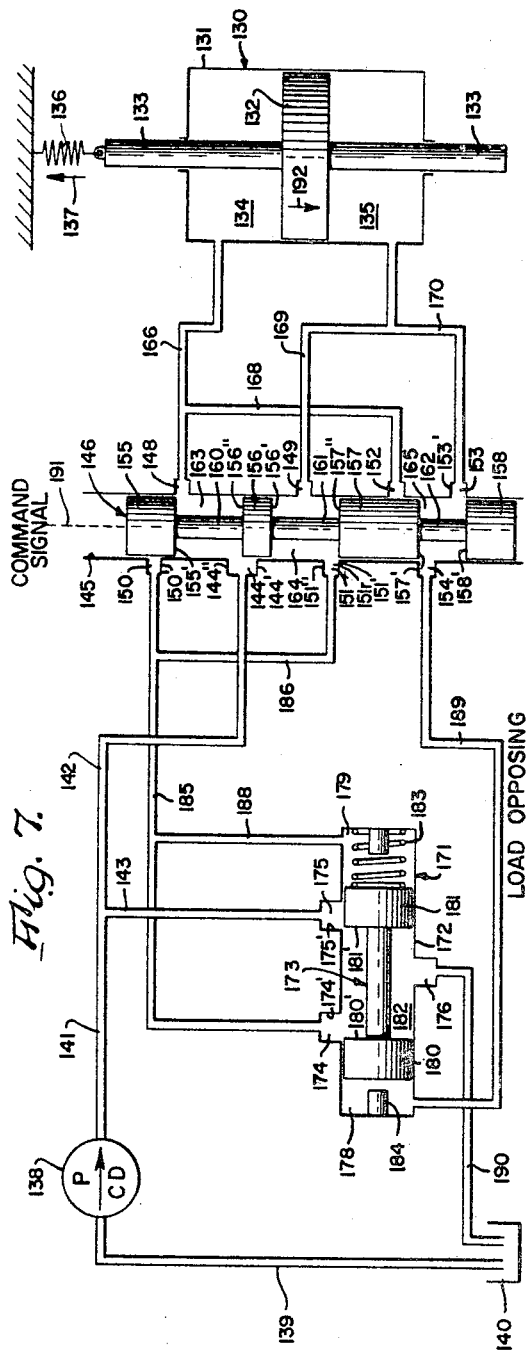
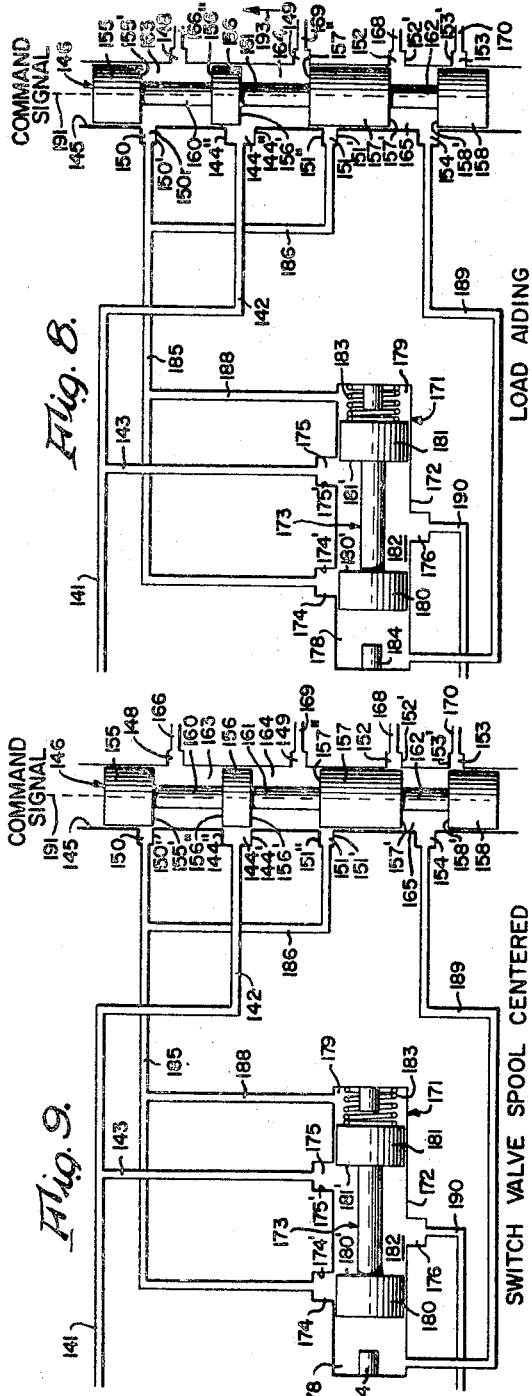

3,398,650
APPARATUS FOR REGULATING FLUID FLOW
WITH RESPECT TO A HYDRAULIC LOAD
Kenneth D. Garnjost, Buffalo, N.Y., assignor to Moog
Inc., East Aurora, N.Y., a corporation of New York
Filed Feb. 4, 1966, Ser. No. 525,242
14 Claims. (Cl. 91—421)

ABSTRACT OF THE DISCLOSURE

An arrangement for maintaining flow of operating fluid with respect to a load actuator substantially constant regardless of whether the load is aiding or opposing the actuator and simultaneously regulating the power from the flow supply in accordance with that required to drive the load.

This invention relates to apparatus for regulating the flow of fluid with respect to a hydraulic load which may change from opposing to aiding fluid drive of the load.

The primary object of the present invention is to provide apparatus which controls the flow of fluid with respect to a load actuator having a fluid driven member so as to drive said member with a controllable velocity regardless of whether the condition of the load may be such as to oppose or aid fluid driven movement of said member, and at the same time the apparatus regulates the power from the flow supply in accordance with that required to drive the load so as to have good power efficiency. An example of a load which may change from opposing to aiding is a flight control surface on a missile.

Another object is to provide such apparatus which is simple, reliable, inexpensive and not likely to get out of order or require repair.

Other objects and advantages of the present invention will appear from the following detailed description of three embodiments taken in conjunction with the accompanying drawings in which:

FIG. 1 is a diagrammatic representation of apparatus embodying one form of the present invention and showing the condition of parts when the load is opposing fluid drive of the load actuator, this form being characterized as a bang-bang, constant velocity, load demand servo.

FIG. 2 is a fragmentary view similar to FIG. 1 but showing the condition of the parts when the load is aiding fluid drive of the actuator.

FIG. 3 is another fragmentary view similar to FIGS. 1 and 2 but showing the condition of the valve spool of the flow regulating means in a centered position with respect to the inlet ports of the cylinder in which the valve spool is slidable and illustrating the underlapped condition of the metering edges of such spool relative to such ports.

FIG. 4 is a diagrammatic representation of apparatus embodying a second form of the present invention and showing the condition of parts when the load is opposing fluid drive of the load actuator, this form being characterized as a bang-bang, constant velocity, load demand servo with bi-directional flow regulation.

FIG. 5 is a fragmentary view similar to FIG. 4 but showing the condition of the parts when the load is aiding fluid drive of the actuator.

FIG. 6 is another fragmentary view similar to FIGS. 4 and 5 but showing the condition of the valve spool of the flow regulating means in a centered position in the cylinder in which the valve spool is slidable and illustrating the relation of the metering edges of such valve spool to certain ports in the cylinder.

FIG. 7 is a diagrammatic representation of apparatus embodying a third form of the present invention and showing the condition of parts when the load is opposing fluid drive of the load actuator, this form being characterized as a proportional velocity, load-demand servo.

FIG. 8 is a fragmentary view similar to FIG. 7 but showing the condition of the parts when the load is aiding fluid drive of the actuator.

FIG. 9 is another fragmentary view similar to FIGS. 7 and 8 but showing the condition of the switch valve spool in a centered position in its slideway and illustrating the relation of the metering edges of such valve spool to ports in the slideway.

FIGURES 1–3

The numeral 10 represents generally a load actuator shown as having a vertically arranged cylinder 11 in which a piston 12 mounted on a rod 13 is slidably arranged to provide chambers 14 and 15 on opposite sides of the piston. The upper end of piston rod 13 is shown as connected to a load represented by a spring 16 which is in tension so as to bias piston 12 upwardly in the direction of arrow 17. Thus if drive fluid is introduced in upper chamber 14 to drive piston 12 downwardly in the direction of arrow 27 (FIG. 1) the load will oppose. On the other hand, if drive fluid is introduced into lower chamber 15 to drive piston 12 upwardly in the direction of arrow 37 (FIG. 2) the load will aid.

Means are provided for maintaining fluid flow with respect to actuator 10 constant regardless of whether load 16 is aiding or opposing the fluid drive of piston 12, and will now be described.

The numeral 18 represents a constant delivery pump of any suitable construction which draws fluid through an inlet conduit 19 from a sump 20 and delivers it through a discharge conduit 21 to switch valve means 22. Extending between switch valve means 22 and actuator 10 is a pair of actuator conduits 23 and 24, conduit 23 communicating with upper actuator chamber 14 and conduit 24 communicating with lower actuator chamber 15. Also associated with switch valve means 22 is a fluid return conduit 25.

Operatively associated with supply conduit 21 and return conduit 25 are flow regulating means represented generally by the numeral 26. Such means are shown as including a slideway 28 and a slide 32. Slideway 28 is in the form of a cylinder having a pair of axially spaced inlet ports 29 and 30 arranged on opposite sides of an outlet port 31. Slidably arranged in cylinder 28 is slide 32 which is of shorter length to provide end chambers 33 and 34 and this slide is shown as being in the form of a valve spool including a pair of axially spaced cylindrical lobes 35 and 36 connected by a central rod 38 of smaller diameter so as to leave an annular space 39 surrounding this rod.

When valve spool 32 is in a centered position with respect to inlet ports 29 and 30 as shown in FIG. 3, the opposing end faces 40 and 41 of lobes 35 and 36, respectively, are spaced further apart than the adjacent edges 29' and 30' of these inlet ports. In other words, valve spool 32 has metering edges 40' and 41' which are underlapped with respect to port metering edges 29' and 30' so that both of ports 29 and 30 can be open at the same time.

Return conduit 25 is shown as communicating with inlet port 29 which may therefore be termed a return port. A branch conduit 42 establishes communication between supply conduit 21 and the other inlet port 30 which may therefore be termed a supply port. A drain conduit 43 establishes communication between outlet port 31 and sump 20.

Fluid restrictor means 44 are shown as arranged in return conduit 25 to provide a restricted orifice of fixed area through which fluid flowing in this conduit toward return port 29 must pass.

Means are provided for applying to slide 32 the differential pressure across restrictor 44 so as to urge this slide to move in a direction tending to open supply port 30. For this purpose, a branch conduit 45 is shown as establishing communication between return conduit 25 upstream of restrictor 44 and left spool and chamber 33 and may therefore be termed an upstream feedback conduit. Another branch conduit 46 is shown as establishing communication between return conduit 25 downstream of restrictor and right spool end chamber 34 and may therefore be termed a downstream feedback conduit. By these means the differential pressure across restrictor 44 due to the pressure drop in fluid flowing through this restrictor is applied to valve spool 32 always in a direction tending to move the same to open supply port 30 and to close return port 29. Since branch conduit 45 will always carry the higher pressure as compared to branch conduit 46, valve spool 32 will be fluidly driven toward spool end chamber 34, or to the right as viewed in the figures.

Means are provided biasing valve spool 32 always in a direction tending to move the same to close supply port 30 and to open return port 29, in opposition to movement induced by the aforementioned differential pressure. Such biasing means are shown as comprising a helical compression spring 48 arranged in right spool end chamber 34 and engaging this valve spool to urge it to move toward left spool end chamber 33. However, it will be understood that if the same fluid pressure exists in both spool end chambers 33 and 34, as is the case when there is no flow through return conduit 25, spring 48 will move valve spool 32 against stop 47 in left chamber 33 and thereby completely close off supply port 30 and at the same time fully open return port 29.

Switch valve means 22 is illustrated schematically as having two positions A and B. Position A establishes communication between conduits 21 and 23 and between conduits 24 and 25, represented by parallel but reversed arrows 50, and the switch valve means 22 is illustrated in FIG. 1 in this position A. Position B establishes communication between conduits 21 and 24 and between conduits 23 and 25, represented by crossed arrows 51, and the switch valve means 22 is illustrated in FIG. 3 in this position B.

Switch valve means 22 may be of any suitable construction and is operated selectively in any suitable manner to perform the two indicated functions, firstly, of supplying pressurized fluid to upper actuator chamber 14 while allowing fluid to be exhausted from lower actuator chamber 15, and secondly and alternatively, of supplying pressurized fluid to lower actuator chamber 15 while allowing fluid to be exhausted from upper actuator chamber 14.

An example of a suitable switch means 22 is an electrical torque motor and valve spool reciprocated thereby. Energization of the torque motor is cyclically reversed so that the valve spool is constantly reciprocating, that is, alternating between positions A and B, to provide a bistable control system also known to those skilled in the art as a bang-bang servo system.

In operation, when switch valve means 22 is in position A as illustrated in FIG. 1, load 16 will be opposing the downward movement of actuator piston 12. Assuming that actuator piston 12 is at rest initially so that there is no flow of fluid through return conduit 25 and restrictor 44 resulting in no difference in pressure in spool end chambers 33 and 34, it will be seen that spring 48 forces valve spool hardover against stop 47 so as to close off supply port 30. Full supply pressure in main supply line 21 can therefore be applied to the upper surface of actuator piston 12 to force it downwardly against load opposition. As soon as actuator piston 12 begins to move in the direction of arrow 27 fluid is displaced from lower actuator chamber 15 into and through connected conduits 24 and 25 and also through restrictor 44. This develops a differential pressure in spool end chambers 33 and 34 which is applied to the spool end faces forcing the spool against the urging of spring 48 to open partially supply port 30 and to close partially return port 29. The valve spool displacement continues until a force balance is achieved between the force exerted by spring 48 and the force exerted by the differential pressure. Since the load is opposing, the pressure of fluid being exhausted from lower actuator chamber 15 is relatively low so that a relatively small differential pressure is developed across restrictor 44. It will be seen that fluid is throttled in flowing between metering edges 30' and 41' toward outlet 31, allowing pressure to build up in conduit 23.

Assume now that switch valve means 22 is changed to position B as illustrated in FIG. 2 so that the load 16 will be aiding the upward fluid drive of actuator piston 12. In changing its direction of movement actuator piston 12 comes to rest, again allowing spring 48 to urge valve spool 32 to move hardover against stop 47. This tends to close supply port 30 but as soon as actuator piston 12 begins to move upwardly in the direction of arrow 37 the pressure of fluid being exhausted from upper actuator chamber 14 through connected conduits 23 and 25 is relatively high so that a large differential pressure is developed across restrictor 44 and which is applied to valve spool 32. This causes valve spool 32 to be driven farther to the right as depicted in FIG. 2, compared to FIG. 1, because spring 48 will have to be compressed more before it can achieve a force balance with the higher differential pressure. As a consequence, left lobe 35 covers most of return port 29, metering edges 29' and 40' being closer together, and right lobe 36 uncovers most of supply port 30, metering edges 30' and 41' being farther apart. This relieves some of the pressure in conduit 21 downstream or to the right of its connection with branch conduit 42 and leading to lower actuator chamber 15 and throttles the flow of return fluid from upper actuator chamber 14.

From the foregoing, it will be seen that because restrictor 44 is fixed in size the flow of fluid into one actuator chamber and hence the flow of fluid out of the other actuator chamber will be substantially constant and hence the actuator piston 12 will move with substantially constant velocity regardless of whether the load is opposing or aiding the fluid drive, and this is achieved while the power from the flow supply is adjusted in accordance with that required to drive the load.

That portion of conduit 21 between pump 18 and branch conduit 42 constitutes main supply conduit means for supplying a substantially constant flow of fluid. When switch valve means 22 is in position A, that portion of conduit 21 between branch conduit 42 and the switch valve and conduit 23 are connected and constitute one actuator conduit means establishing communication between said main supply conduit means and actuator chamber 14, while in this position conduits 24 and 25 are connected and constitute another actuator conduit means establishing communication between return port 29 and the other actuator chamber 15. When switch valve means 22 is in position B, that portion of conduit 21 between branch conduit 42 and the switch valve and conduit 24 are connected and constitute one actuator conduit means establishing communication between said main supply conduit means and actuator chamber 15, while conduits 23 and 25 are connected and constitute another actuator conduit means establishing communication between return port 29 and the other actuator chamber 14.

If restrictor 44 is in return conduit 25 on the downstream side of switch valve means 22 as shown in FIGS. 1–3 and there is excessive leakage in this means, then the restrictor will not read accurately the fluid flow out of actuator 10. Accordingly, the form of the invention shown in FIGS. 1–3 is recommended because of its simplicity where switch leakage can be minimized or in an unidirectional application where no reversing switch valve means is required.

FIGURES 4-6

The second form of the invention shown in FIGS. 4-6 overcomes the possible disadvantage of the first form shown in FIGS. 1-3 with respect to switch leakage by placing a restrictor in one of the actuator conduit means between the switch valve means and the power actuator but this requires adaptation of the mechanism to handle bi-directional fluid flow through the restrictor.

Referring to FIG. 4, the numeral 60 represents a load actuator, similar to load actuator 10, having a cylinder 61, piston 62, piston rod 63, upper actuator chamber 64, lower actuator chamber 65, and a load represented by a tensioned spring 66 urging piston 62 upwardly in the direction of arrow 67.

The numeral 68 represents a constant delivery pump of any suitable construction which draws fluid through an inlet conduit 69 from a sump 70 and delivers it through a discharge conduit 71. This main supply conduit 71 has two branch conduits 72 and 73. Branch conduit 72 is connected in fluid conducting communication with a switch valve means 74. Extending between switch valve means 74 and actuator 60 is a pair of actuator conduits 75 and 76 communicating with upper and lower actuator chambers 64 and 65 respectively. Also associated with switch valve means 74 is a fluid return conduit 78. Conduit 76 is shown as having a fixed flow restrictor 79 arranged therein.

Switch valve means 74, like the corresponding means 22 shown in FIG. 1, is illustrated schematically as having two operative positions A' and B'. Position A' illustrated in FIG. 4 establishes communication between conduits 72 and 75 and between conduits 76 and 78, represented by parallel but reversed arrows 80. Position B' illustrated in FIG. 5 establishes communication between conduits 72 and 76 and between conduits 75 and 78, represented by crossed arrows 81.

Operatively associated with branch fluid supply conduit 73 and fluid return conduit 78 are flow regulating means represented generally by the numeral 82. Such means are shown as including a slideway 83 and a slide 84.

Slideway 83 is in the form of a cylinder having return port means including an inlet port 85 and an outlet port 86 axially spaced therefrom, supply port means including port 88 axially spaced from port 85, and a pair of outlet ports 89 and 90 arranged on opposite sides in an axial direction of supply port 88. Branch drain conduits 91, 92 and 93 connect outlet ports 86, 89 and 90, respectively, to a main drain conduit 94 which communications with sump 70.

Slide 84 is shown as being in the form of a valve spool including four axially spaced cylindrical lobes 95, 96, 97 and 98 connected by central rods 100, 101 and 102 severally of smaller diameter so as to leave annular spaces 103, 104 and 105 surrounding these rods. Left end lobe 95 is operatively associated with left end outlet port 86 of the return port means, left center lobe 96 with inlet port 85 of the return port means, and right center lobe 97 with supply port 88. Center and right end outlet ports 89 and 90 are arranged on opposite sides of right center lobe 97 and always remain in communication with annular spaces 104 and 105, respectively.

Referring to FIG. 6 which illustrates the regulator valve spool 84 in a centered position, right center lobe 97 has left and right metering edges 97' and 97'' axially spaced from each other a distance corresponding to the axial spacing of the left and right metering edges 88' and 88'' of supply port 88 so that this supply port is closed when the valve spool is in this centered position. Still referring to FIG. 6, left center lobe 96 has a left metering edge 96' in radial alinement with right metering edge 85' of inlet port 85, and left end lobe 95 has a right metering edge 95' in radial alinement with left metering edge 86' of left end outlet port 86, when the valve spool is in this centered position.

The left end portion of cylinder 83 is enlarged to provide a left end chamber 106 having at its inner end an outwardly facing annular radially extending end wall or shoulder 108. The right end portion of cylinder 83 is also enlarged to provide a right end chamber 109 having at its inner end an outwardly facing annular radially extending end wall or shoulder 110. Valve spool 84 has an overall axial length, as measured between the radial and flat outer end faces 111 and 112 of end lobes 95 and 98, respectively, which corresponds to the axial spacing between oppositely facing end walls or shoulders 108 and 110, as best shown in FIG. 6 wherein the valve spool is illustrated in a centered position, so that left spool end face 111 is in radial alinement with end wall 108 and right spool end face 112 radially alines with end wall 110.

A spring 113 is shown arranged in left end chamber 106 as a helical compression spring having its outer end bearing against the outer end wall of this chamber and its inner end bearing against a thrust member 114 urging the same toward left cylinder shoulder 108. A similar helical compression spring 115 is shown arranged in right end chamber 109 and has its outer end bearing against the outer end wall of this chamber and its inner end bearing against a thrust member 116 urging the same toward right cylinder shoulder 110. Thrust members 114 and 116 are of any suitable perforated construction and are shown as washers or flat rings to allow fluid pressure in end chambers 106 and 109 to be applied at all times against the respective spool end faces 111 and 112. Stops 118 and 119 are shown in end chambers 106 and 109, respectively, for engagement with the corresponding spool outer end face or adjacent thrust member and thereby limit the maximum displacement of the valve spool in either direction. Maximum displacement is when supply port 88 is fully uncovered.

A first feedback conduit 120 is shown as connecting left end chamber 106 with actuator conduit 76 to the left of restrictor 79, and a second feedback conduit 121 is shown as connecting right end chamber 109 with actuator conduit 76 to the right of this restrictor.

In operation, when switch valve means 74 is in position A' as illustrated in FIG. 4, load 66 will be opposing movement of actuator piston 62 in the downward direction 77. Assuming that this actuator piston is at rest initially so that there is no flow of fluid through connected return conduits 76 and 78 and restrictor 79 therein resulting in no difference in pressure in spool end chambers 106 and 109, it will be seen that springs 113 and 115 maintain valve spool 84 in its centered position shown in FIG. 6 in which lobe 97 completely closes supply port 88 and lobes 95 and 96 leave return ports 85 and 86 completely uncovered. Full supply pressure in main supply line 71 can therefore be applied through connected conduits 72 and 75 to upper actuator chamber 64 to force piston 62 downwardly against load opposition. As soon as actuator piston 62 begins to move in the direction of arrow 77, fluid is displaced from lower actuator chamber 65 into and through connected conduits 76 and 78 and through restrictor 79 included therein. This develops a differential pressure in spool end chambers 106 and 109 which is applied to spool end faces 111 and 112, with the dominant pressure being in right chamber 109, forming spool 84 against the urging of left spring 113 to open partially supply port 88 and to close partially return inlet port 85. The valve spool displacement continues until a force balance is achieved between the force exerted by left spring 113 and the force exerted by the differential pressure. Since the load is opposing, the pressure of fluid being exhausted from lower actuator chamber 65 is relatively low so that a relatively small differential pressure is developed across restrictor 79. It will be seen that fluid is throttled in flowing between metering edges 97″ and 88″ toward outlet 90, allowing pressure to build up in conduit 75.

During the just described leftward movement of valve spool 84 it will be noted that right spool end face 112 moved away from right thrust member 116 which remained in contact with right shoulder 110 so as to render right spring 115 ineffective in determining spool position.

Assume now that switch valve means 74 is changed to position B′ as illustrated in FIG. 5 so that load 66 will be aiding the upward fluid drive of actuator piston 62. In changing its direction of movement actuator piston 62 comes to rest, causing left spring 113 to expand and move valve spool 84 to its centered position shown in FIG. 6. This recloses supply port 88 but as soon as actuator piston 62 begins to move upwardly in the direction of arrow 87 (FIG. 5) the flow of fluid being exhausted from upper actuator chamber 64 through connected conduits 75 and 78 is relatively high. As well, a relatively high flow of fluid is being urged through conduit 76 including restrictor 79 therein toward lower actuator chamber 65. This develops a relatively large differential pressure across restrictor 79 and which is applied to valve spool 84 with the predominant pressure being in left spool end chamber 106. This causes the valve spool to be driven farther to the right as depicted in FIG. 5, compared to FIG. 6, because right spring 115 must be compressed before it achieves a force balance with the effect of the differential pressure. As a consequence left end lobe 95 covers most of return outlet port 86, metering edge 95′ of this lobe and right metering edge 86″ of this port being closer together, and right center lobe 97 uncovers most of supply port 88, metering edges 88′ and 97′ being farther apart. This relieves some of the pressure in connected conduit 72 and 76 leading to lower actuator chamber 65 and throttles the flow of return fluid from upper actuator chamber 64 through connected conduit 75 and 78.

From the foregoing, it will be seen that when switch valve means 74 is in position A′ connected conduits 76 and 78 constitute one actuator conduit means in which restrictor 79 is arranged, the other actuator conduit means being provided by connected conduits 72 and 75; whereas when the switch valve means is in position B′ connected conduits 76 and 72 constitute one actuator conduit means in which restrictor 79 is arranged, the other actuator conduit means being provided by connected conduits 75 and 78. In one case, the restrictor 79 is in a return conduit for the actuator and in the other case in the supply conduit for the actuator. In either case restrictor 79 reads accurately the flow resulting from displacement of actuator piston 62, regardless of whether or not there may be leakage at the switch valve means 74.

FIGURES 7–9

The third form of the invention shown in FIGS. 7–9 is characterized by having a variable restrictor, as compared to the fixed restrictors 44 and 79 of FIGS. 1–6, and hence provides variable velocity control of the actuator piston, and is further characterized by utilizing a reversing valve to provide such variable restrictor and thereby combines restrictor and switch controls.

Referring to FIG. 7, the numeral 130 represents a load actuator, similar to actuators 10 and 60, having a cylinder 131, piston 132, piston rod 133, upper actuator chamber 134, lower actuator chamber 135, and a load represented by a tensioned spring 136 urging piston 132 upwardly in the direction of arrow 137.

The numeral 138 represents a constant delivery pump of any suitable construction which draws fluid through an inlet conduit 139 from a sump 140 and delivers it through a discharge conduit 141. This main supply conduit 141 has two branches 142 and 143. Branch conduit 142 is connected to a supply port 144 provided in a slideway 145 for a valve spool represented generally by the numeral 146.

Slideway 145 is shown as cylindrical and also as having a pair of actuating ports 148 and 149, a pair of return ports 150 and 151, a pair of upstream feedback ports 152 and 153, and a downstream feedback port 154. These various ports are axially spaced from one another, return ports 150 and 151 being arranged on opposite sides of supply port 144, upper actuating port 148 being arranged intermediate upper return port 150 and supply port 144 while lower actuating port 149 is arranged between this supply port and lower return port 151, and upstream feedback ports 152 and 153 being arranged on opposite sides of downstream feedback port 154.

Valve spool 146 is shown as having four cylindrical lobes 155, 156, 157 and 158 connected by central rods 160, 161 and 162 of smaller diameter to provide between adjacent lobes annular spaces 163, 164 and 165. Actuating ports 148 and 149 severally communicate at all times with spaces 163 and 164 respectively. Downstream feedback port 154 communicates at all times with space 165. This space 165 may be regarded as a groove having a width corresponding to the axial spacing between the adjacent edges of upstream feedback ports 152 and 153.

Upper lobe 155 is operatively associated with upper return port 150, upper center lobe 156 with supply port 144, lower center lobe 157 with both lower return port 151 and upper upstream feedback port 152, and lower lobe 158 with lower upstream feedback port 153. More specifically, the axially spacing of the metering edges of the various ports and lobes is such that, when valve spool 146 is in null or centered position as depicted in FIG. 9, the lower metering edge 155′ of upper lobe 155 is radially alined with the lower metering edge 150′ of upper return port 150, the metering edges 156′ and 156″ of upper center lobe 156 are radially alined severally and respectively with the metering edges 144′ and 144″ of supply port 144, the upper metering edge 157″ of lower center lobe 157 is radially alined with the upper metering edge 151″ of lower return port 151, the lower metering edge 157′ of this lobe is radially alined with the lowering metering edge 152′ of upper upstream feedback port 152, and the upper metering edge 158′ of lower lobe 158 is radially alined with the upper metering edge 153′ of lower upstream feedback port 153.

An upper control conduit 166 is shown as connecting upper actuating port 148 with upper actuator chamber 134, and has a branch feedback conduit 168 communicating with upper upstream feedback port 152. A lower control conduit 169 is shown as connecting lower actuating port 149 with lower actuator chamber 135 and has a branch feedback conduit 170 leading to and communicating with lower upstream feedback port 153.

A flow regulator represented generally by the numeral 171, and similar to the flow regulator 26 of FIGS. 1–3, is shown as including a slideway 172 and a slide 173. Slideway 172 is in the form of a cylinder having a pair of axially spaced inlet ports 174 and 175 arranged on opposite sides of an outlet port 176. Slidably arranged in cylinder 172 is a slide 173 which is of shorter length to provide end chambers 178 and 179 and this slide is also shown as being in the form of a valve spool including a pair of axially spaced cylindrical lobes 180 and 181 connected by a central rod of smaller diameter so as to leave an annular space 182 surrounding this rod.

Regulator valve spool 173, like spool 32 of FIGS. 1–3, has the opposing metering edges 180′ and 181′ of lobes 180 and 181, respectively, underlapped with respect to the adjacent metering edges 174′ and 175′ of ports 174 and 175 respectively. A spring 183 in right spool end chamber 179 bears against valve spool 173 to urge it to move leftwardly toward left spool end chamber 178 thereby tending to close right port 175 and open left port 174, such movement being limited by engagement with a stop 184.

Branch supply conduit 143 communicates with right port 175 which thereby becomes a supply port. Left port 174 is shown as communicating via a return conduit 185 with upper return port 150 and via a branch conduit 186 also with lower return port 151. Another branch conduit 188 establishes communication between return conduit 185 and right spool end chamber 179 so as to feedback pressure in such conduit 185 to the right end face of regulator valve spool 173.

A conduit 189 establishes communication between downstream feedback port 154 with left spool end chamber 178 so as to feedback pressure in such port to the left end face of regulator valve spool 173. A drain conduit 190 establishes communication between outlet port 176 and sump 140.

Reversing or switch valve spool 146 may be selectively commanded as to position by any suitable means (not shown) but represented by the broken line 191. Typically, although not limited thereto, such means could be a torque motor and hydraulic amplifier capable of generating a differential pressure in proportionate response to an electrical input signal to the torque motor, such differential pressure being applied to valve spool 146 in order to effect its displacement.

In operation, let it first be assumed that switch valve spool 146 is in its null or centered position depicted in FIG. 9. This position obtains when there is no command signal. Ports 150, 144, and 153 are closed by lobes 155, 156 and 158, respectively, and lobe 157 closes both ports 151 and 152. Inasmuch as with such an arrangement it is difficult to prevent leakage past the lobes, it is assumed that the leakage past metering edges 144' and 156' into space 164 and past metering edges 144" and 156" into space 163 produces an equal pressure in actuator conduits 166 and 169 and hence in actuator chambers 134 and 135 but which pressure is below that in branch supply conduit 142. Since left spool end chamber 178 is a closed space connected via conduit 189, annular space 165, leakage past metering edges 152' and 157' and associated conduit 168, and leakage past metering edges 153' and 158' and associated conduit 170, and equal pressure in actuator conduits 166 and 169 is applied to the left end face of regulator valve spool 173. This pressure is higher than that which obtains in right spool end chamber 179 because return conduit 185 is connected to drain conduit 190 via ports 174 and 176 and intermediate annular space 182 and therefore the pressure drop is greater across the leakage between the pair of metering edges 150' and 155' and between the pair of metering edges 151" and 157". As a consequence a pressure differential exists in spool end chambers 178 and 179 with the predominant pressure being in left chamber 178 thereby fluidly driving valve spool 173 rightwardly until a force balance is achieved with spring 183, leaving the valve spool so displaced that supply port 175 is open more than return port 174. This results in a bypassing of fluid supplied by pump 138 and a reduction in the pressure in conduit 142.

Now assume that a command signal is applied to shift switch valve spool 146 downwardly, as depicted in FIG. 7. As a result, upper lobe 155 covers upper return port 150, upper center lobe 156 uncovers supply port 144, lower center lobe 157 uncovers lower return port 151 while covering upper upstream feedback port 152, and lower lobe 158 uncovers lower upstream feedback port 153. Thus, supply port 144 communicates with upper actuating port 148 and lower return port 151 communicates with lower actuating port 149. This allows pressurized fluid to flow through control conduit 166 into upper actuator chamber 134, driving actuator piston 132 downwardly in the direction of arrow 192 and opposing the load 136, while fluid is exhausted from lower actuator chamber 135 through control conduit 169.

The spacing between metering edges 151" and 157" provides a restrictor, indicated at 151r, in a conduit (169, 186, 185) leading to return port 174. The pressure upstream of this restrictor 151r in conduit 169 is applied to left spool end chamber 178 via feedback conduits 170 and 189 which are connected through ports 153 and 154 and intermediate annular space 165.

Since the load is opposing the fluid drive, the pressure of fluid being exhausted from lower actuator chamber 135 is relatively low so that a relatively small differential pressure is developed across restrictor 151r. This allows a new force balance with spring 183 to be achieved resulting in some leftward displacement of valve spool 173 so that supply port 175 is partially closed while return port 174 is partially opened. It will be seen that fluid is throttled in flowing between the opposing metering edges 181' and 175' toward outlet 176, allowing pressure to build up in conduit 142.

Assume now that the switch valve spool 146 is shifted upwardly above its null position by a changed command signal, as depicted in FIG. 8, so that the load will be aiding the upward fluid drive of actuator piston 132. This upward drive is represented by arrow 193 in FIG. 8. As a result, upper lobe 155 uncovers upper return port 150, upper center lobe 156 uncovers supply port 144, lower center lobe 157 covers lower return port 151 while uncovering upper upstream feedback port 152, and lower lobe 158 covers lower upstream feedback port 153. Thus, supply port 144 now communicates with lower actuating port 149 while upper return port 150 communicates with upper actuating port 148. This allows pressurized fluid to flow through control conduit 169 into lower actuator chamber 135, driving actuator piston 132 upwardly, while fluid is exhausted from upper actuator chamber 134, through control conduit 166.

The spacing between metering edges 150' and 155' provides a restrictor, indicated at 150r, in a conduit (166, 185) leading to return port 174. The pressure upstream of this restrictor 150r in conduit 166 is applied to left spool end chamber 178 via feedback conduits 168 and 189 which are connected through ports 152 and 154 and intermediate annular space 165.

Since the load is aiding, the pressure of fluid being exhausted from upper actuator chamber 134 is relatively high so that a relatively high differential pressure is developed across restrictor 150r. This allows a new force balance with spring 183 to be achieved resulting in rightward displacement of valve spool 173, from the leftward displaced position thereof shown in FIG. 7, so that return port 174 is partially closed while supply port 175 is partially opened, as depicted in FIG. 8. It will be seen that fluid is throttled in flowing between the opposing metering edges 180' and 174' toward outlet 176. Also, because metering edges 175' and 181' are now farther apart supply pressure is reduced in conduit 142.

From the foregoing, it will be seen that the alternate restrictors 150r and 151r are variable in effective size depending upon the extent to which switch valve spool 146 is displaced and thereby provide a variable control of the velocity of actuator piston 132. It will also be observed that switch valve spool 146 is a four way valve spool, that ports 150 and 151 are alternately operative throttling ports associated with such spool, and that lobes 157 and 158 and associated ports 152, 153 and 154 serve as transfer valve means for transferring the differential pressure across the operative one of such throttling ports to the flow regulating valve slide 173.

While the pumps 18, 68 and 138 are referred to as constant delivery pumps and it is normally thought that each supplies a substantially constant flow of fluid, this may not actually be the case under varying pressure conditions due to leakage in the pump. Therefore, as a practical matter the useful output of these pumps may vary even substantially under different pressure conditions. Notwithstanding, the arrangement of the invention will maintain the flow of operating fluid with respect to the actuator substantially constant to move the actuator piston with the necessary power at a substantially constant velocity regardless of whether the load is opposing or aiding the fluid drive.

The embodiments illustrated and described achieve the objects stated. Inasmuch as changes may occur to those skilled in the art without departing from the spirit of the present invention these embodiments are illustrative and not limitative of the invention the scope of which is to be measured by the appended claims.

What is claimed is:

1. The combination with a load actuator having a movable fluid driven member and first and second actuator chambers for moving said member in opposite directions and associated with a load which may either aid or oppose fluid driven movement of said member, of means for maintaining flow of operating fluid with respect to said actuator substantially constant regardless of whether the load is aiding or opposing and simultaneously regulating the power from the flow supply in accordance with that required to drive the load, comprising main supply conduit means for supplying a flow of fluid, first actuator conduit means establishing communication between said main supply conduit means and one of said actuator chambers, second actuator conduit means establishing communication between the other of said actuator chambers and a fluid return, flow restrictor means arranged in one of said actuator conduit means, branch supply conduit means establishing communication between said main supply conduit means and a fluid return, and flow regulating means including movable by-pass means operatively associated with said branch supply conduit means for by-passing fluid flowing through said branch supply conduit means as necessary to build up pressure in said one of said actuator chambers to drive the load and also including movable throttling means operatively associated with said second actuator conduit means and fixedly connected to said by-pass means to move therewith for throttling fluid flowing through said second actuator conduit means as necessary to slow down the load.

2. The combination as set forth in claim 1 wherein said branch supply conduit means includes a first inlet port, said second actuator conduit means includes a second inlet port, and said flow regulating means includes a valve slide movable relative to said ports, spring means urging said slide to close said first port and to open said second port and means for applying to said slide the differential pressure across said restrictor means so as to urge said slide to move in a direction opposite from that urged by said spring means.

3. The combination as set forth in claim 2 wherein said differential pressure applying means includes upstream feedback conduit means establishing communication between said one of said actuator conduit means upstream of said restrictor means and one end face of said slide and downstream feedback conduit means establishing communication between said one of said actuator conduit means downstream of said restrictor means and the opposite end face of said slide.

4. The combination set forth in claim 3 wherein said ports are arranged in the wall of a cylinder axially spaced from one another, said slide is a valve spool arranged in said cylinder to provide first and second spool end chambers, said spring means is arranged in one of said end chambers, said upstream feedback conduit means communicates with the other of said end chambers, and said downstream feedback conduit means communicates with said one of said end chambers.

5. The combination set forth in claim 2 which further comprises switch valve means operatively associated with said first and second actuator conduit means and arranged selectively to reverse the relationship of said actuator chambers with respect to said main supply conduit means and said second port.

6. The combination set forth in claim 4 wherein said valve spool has axially spaced first and second lobes the opposing end faces of which are spaced farther apart than the adjacent edges of said ports.

7. The combination as set forth in claim 2 wherein said first and second inlet ports are arranged in the wall of a cylinder axially spaced from one another, an outlet port is provided in said cylinder and axially spaced from said second port, said slide is a four-lobed valve spool arranged in said cylinder and of shorter length to provide spool end chambers each of which has an axially outwardly facing end wall, said spring means includes a spring arranged in each of said end chambers, and further comprising a thrust member interposed between each of said springs and the corresponding one of said end walls, said spool when engaging both said thrust members having a first metering edge on one lobe at one edge of said second inlet port, a second metering edge on a second lobe and facing said first metering edge and at that edge of said outlet port which is remote from said one edge and third and fourth metering edges on a third lobe and severally at the edges of said first inlet port.

8. The combination as set forth in claim 7 and further comprising drain conduit means communicating with said outlet port, with said cylinder between said second and third lobes and with said cylinder between said third lobe and the fourth lobe of said spool.

9. The combination as set forth in claim 1 wherein said restrictor means is variable in effective size.

10. The combination as set forth in claim 5 wherein said restrictor means is variable in effective size and combined with said switch valve means.

11. The combination as set forth in claim 5 wherein said switch valve means comprises a four way valve spool, and said restrictor means includes alternately operating throttling ports associated with said four way valve spool.

12. The combination as set forth in claim 2 wherein said first actuator conduit means includes a supply port in a slideway, one of a pair of actuating ports in said slideway, one of a pair of control conduit means severally leading from said actuating ports to said actuator chambers and a first space between a first lobe and one of a pair of second lobes on opposite sides of said first lobe to establish communication between said supply port and said one of said actuating ports; said second actuator conduit means includes one of a pair of intercommunicating return ports in said slideway on opposite sides of said supply port, the other of said actuating ports, the other of said control conduit means and a second space between said first lobe and the other of said second lobes, said one of said second lobes blocking the other of said return ports when said first space communicates with said supply port, the extent to which said one of said return ports is uncovered by said other of said second lobes providing a variable orifice constituting said flow restrictor means, all of said lobes being connected together and movable selectively as a unitary valve spool.

13. The combination as set forth in claim 11 wherein said differential pressure applying means includes transfer valve means movable with said four way valve spool for transferring the differential pressure across the operative one of said throttling ports to said slide.

14. The combination as set forth in claim 11 wherein said differential pressure applying means includes a first feedback port in said slideway, a pair of second feedback ports in said slideway on opposite sides of said first feedback port, first feedback conduit means establishing communication between said first feedback port and one end face of said slide, a pair of upstream feedback conduit means severally establishing communication between said second feedback ports and said control conduit means and downstream feedback conduit means establishing communication between said return ports and the other end face of said slide, said valve spool when in null position having its said first lobe closing said supply port and its said second lobes severally closing said return ports, said valve spool being provided with a groove having a width corresponding to the axial spacing between the adjacent edges of said second feedback ports and arranged to establish communication between said first feedback port and one of said second feedback ports when said valve spool is displaced from said null position.

References Cited

UNITED STATES PATENTS

| | | | |
|---|---|---|---|
| 2,621,676 | 12/1952 | Loft | 91—421 |
| 2,864,402 | 12/1958 | Presnell | 91—421 |
| 3,095,906 | 7/1963 | Kolm | 91—421 |
| 3,145,734 | 8/1964 | Lee et al. | 137—117 |
| 3,234,957 | 2/1966 | Allen | 137—117 |
| 3,237,636 | 3/1966 | Strader | 137—596.13 |

MARTIN P. SCHWADRON, *Primary Examiner.*

B. L. ADAMS, *Assistant Examiner.*